(12) United States Patent
Vlachos

(10) Patent No.: US 10,948,730 B2
(45) Date of Patent: *Mar. 16, 2021

(54) DYNAMIC PANEL MASKING

(71) Applicant: Valve Corporation, Bellevue, WA (US)

(72) Inventor: Alex Vlachos, Bellevue, WA (US)

(73) Assignee: Valve Corporation, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/712,370

(22) Filed: Dec. 12, 2019

(65) Prior Publication Data
US 2020/0117015 A1 Apr. 16, 2020

Related U.S. Application Data

(63) Continuation of application No. 16/033,162, filed on Jul. 11, 2018, now Pat. No. 10,520,739.

(51) Int. Cl.
| | |
|---|---|
| *G09G 5/00* | (2006.01) |
| *G02B 27/01* | (2006.01) |
| *G06F 3/03* | (2006.01) |
| *G06F 3/01* | (2006.01) |
| *G06T 15/00* | (2011.01) |

(Continued)

(52) U.S. Cl.
CPC ..... *G02B 27/0189* (2013.01); *G02B 27/0172* (2013.01); *G02B 27/18* (2013.01); *G06F 3/012* (2013.01); *G06F 3/0312* (2013.01); *G06T 15/005* (2013.01); *G02B 2027/0132* (2013.01); *G06T 19/006* (2013.01)

(58) Field of Classification Search
CPC .............. G02B 27/017; G02B 27/0172; G02B 27/0189; G02B 27/18; G02B 2027/0132; G02B 2027/0187; G06F 3/012; G06F 3/013; G06F 3/0312; G06T 15/005; G06T 19/006

See application file for complete search history.

(56) References Cited

U.S. PATENT DOCUMENTS 10,297,077 B1 * 5/2019 Vlachos .................. G06T 15/30
10,520,739 B1 * 12/2019 Vlachos ................. G02B 27/18

(Continued)

OTHER PUBLICATIONS

The PCT Search Report and Written Opinion dated Oct. 18, 2019 for PCT Application No. PCT/US19/41432, 8 pages.

*Primary Examiner* — Joe H Cheng

(74) *Attorney, Agent, or Firm* — Lee & Hayes, P.C.

(57) ABSTRACT

A panel mask(s) rendered on a display panel(s) of a head-mounted display (HMD) may be dynamically adjusted (increased and decreased) in size in order to hide unwanted visual artifacts from view, as needed. For example, if frames are being rendered on the display panel of the HMD using re-projection, a size value associated with at least a portion of the panel mask can be adjusted based on rotation of the HMD to increase or decrease a size of at least the portion of the panel mask from a current size to an adjusted size, and the panel mask can be rendered with at least the portion of the panel mask rendered at the adjusted size to hide the unwanted visual artifacts. The size of the portion of the panel mask can subsequently decrease, over a period of time, if re-projection ceases and/or if head rotation ceases or slows down.

20 Claims, 7 Drawing Sheets

(51) Int. Cl.
*G02B 27/18* (2006.01)
*G06T 19/00* (2011.01)

(56) References Cited

U.S. PATENT DOCUMENTS

| | | |
|---|---|---|
| 10,600,236 B2 * | 3/2020 | Leiby .................... G06T 19/006 |
| 10,733,783 B2 * | 8/2020 | Vlachos .................. G06T 17/20 |
| 2002/0163486 A1 | 11/2002 | Ronzani et al. |
| 2004/0041822 A1 | 3/2004 | Iizuka et al. |
| 2008/0088646 A1 | 4/2008 | Sako et al. |
| 2009/0273612 A1 | 11/2009 | Xie |
| 2013/0127980 A1 | 5/2013 | Haddick et al. |
| 2013/0278631 A1 | 10/2013 | Border et al. |
| 2013/0335321 A1 | 12/2013 | Sugita et al. |
| 2014/0168056 A1 | 6/2014 | Swaminathan et al. |
| 2015/0370071 A1 | 12/2015 | Alton et al. |
| 2016/0035140 A1 * | 2/2016 | Bickerstaff ........... G06T 19/006 345/633 |
| 2016/0085076 A1 | 3/2016 | Hoellwarth |
| 2016/0171779 A1 | 6/2016 | Bar-Zeev et al. |
| 2016/0246061 A1 * | 8/2016 | Bickerstaff ........ H04N 5/23258 |
| 2016/0337630 A1 * | 11/2016 | Raghoebardajal ... H04N 13/128 |
| 2016/0366392 A1 * | 12/2016 | Raghoebardajal ..... H04N 19/17 |
| 2016/0379413 A1 | 12/2016 | Yamamoto et al. |
| 2017/0045941 A1 | 2/2017 | Tokubo et al. |
| 2017/0169621 A1 | 6/2017 | Kawamoto et al. |
| 2017/0186236 A1 | 6/2017 | Kawamoto |
| 2017/0228855 A1 | 8/2017 | Bates et al. |
| 2018/0199039 A1 * | 7/2018 | Trepte .................. G06T 15/405 |
| 2018/0261003 A1 | 9/2018 | Peli |
| 2018/0315364 A1 * | 11/2018 | Yamamoto ............. G09G 5/026 |
| 2018/0364485 A1 | 12/2018 | Mallinson |
| 2019/0189089 A1 | 6/2019 | Haraden et al. |
| 2019/0219824 A1 | 7/2019 | Shinohara |
| 2020/0090575 A1 * | 3/2020 | Martin ................ H04N 13/398 |
| 2020/0225473 A1 * | 7/2020 | Selan ...................... G09G 3/22 |

* cited by examiner

DYNAMIC PANEL MASKING

CROSS REFERENCE TO RELATED APPLICATION

This U.S. patent application is a continuation of and claims priority to commonly assigned U.S. patent application Ser. No. 16/033,162, entitled "DYNAMIC PANEL MASKING," and filed on Jul. 11, 2018, now U.S. Pat. No. 10,520,739, the entirety of which is incorporated herein by reference.

BACKGROUND

Virtual reality (VR) systems are used both within and outside of the video game industry. Displays for VR systems, such as those embedded in a VR headset, typically operate at a minimum refresh rate that is suitable for VR applications. For instance, 90 Hertz (Hz) is a common refresh rate for VR displays. In a "live rendering" scenario, a graphics-based application, such as a video game, outputs frames for rendering at a frame rate that matches the refresh rate of the display, meaning that a new frame received from the application (referred to herein as an "actual frame") is displayed at every screen refresh. Such a live rendering scenario is often referred to as the application "hitting frame rate."

In practice, an application does not always hit frame rate for various reasons. For example, the application may intermittently drop a frame, and/or the application may temporarily output frames at a slower rate (e.g., 45 frames per second when the ideal frame rate is 90 frames per second). In situations where the application is not hitting frame rate, a technique called "rotation-only re-projection" can be used to replace missing frames with re-projected frames in a way that accounts for the user's head rotation, making it appear to the user as if the application is hitting frame rate. Without re-projection, for example, a deficient frame rate from the application may cause in-game stuttering or hitching. In VR applications, where the user is fully immersed in the virtual environment, the user can become nauseous if the application fails to hit frame rate and there is no re-projection to compensate for the missing frames. Thus, re-projection is a technique that allows for a better user experience when an application is not hitting frame rate. Consider an example where the application is outputting frames at half the ideal frame rate (e.g., 45 frames per second where 90 frames per second is the ideal frame rate). In this example, every other frame can be re-projected using pixel data from the most recently-rendered actual frame to create a re-projected frame that transforms the scene (e.g., through rotation and re-projection calculations) to match the re-projected scene to the user's current head orientation. This makes it look to the user as if the scene is moving in a way that is expected given the user's head rotation, even when re-projected frames are used to compensate for the application failing to hit frame rate.

Although rotation-only re-projection prevents in-game stuttering or hitching, it produces its own unwanted visual artifacts during head rotation, at least in VR systems that use low-persistence displays (e.g., where the display is illuminated for a small fraction of the frame time). For example, rotation-only re-projection can cause a strobing flash to appear at the leading edge of each display panel in the direction of head rotation when the user is rotating his/her head. This strobing flash occurs during head rotation because the pixels at the leading edge of the display panel toggle every frame between an actual frame's valid pixels and solid black pixels in the following re-projected frame. The black pixels occur during head rotation in the re-projected frames because there is no pixel data available from the previously-rendered actual frame to use for the pixels at the leading edge of the display panel for the re-projected frame. Accordingly, when the user rotates his/her head while re-projection is being used, the leading edges of the display panels in the direction of the user's head rotation toggles every frame between black pixels and illuminated pixels, causing an unwanted strobing artifact at the leading edges of the display panels.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1A:
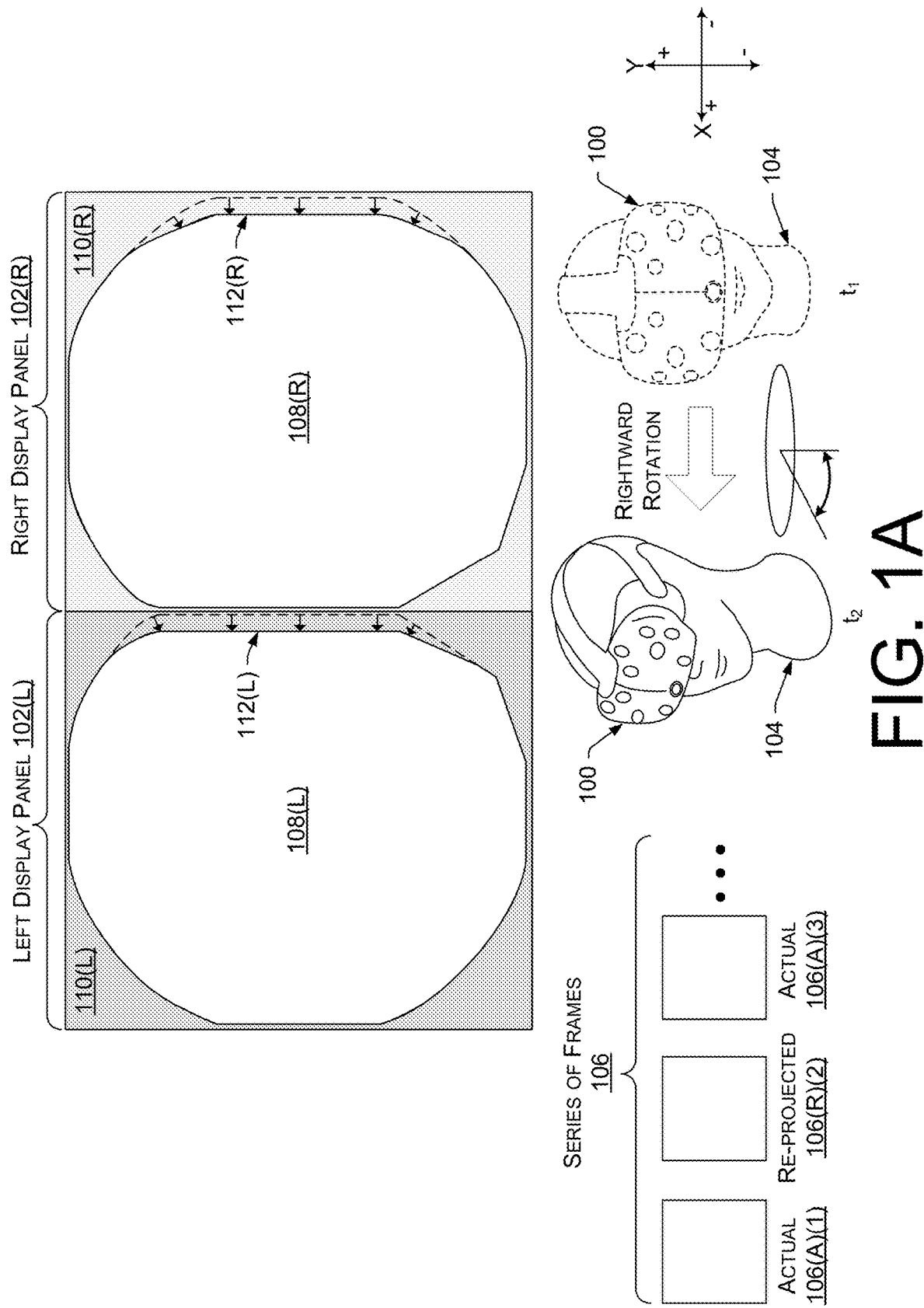
FIG. 1A is a diagram illustrating example left and right display panels of a head-mounted display (HMD) where a frame is rendered with a dynamically expanded panel mask during head rotation while frames are being processed using re-projection, the direction of head rotation being in a rightward (or positive X) direction.

Described herein are, among other things, techniques for dynamically adjusting (increasing and decreasing) a size of a panel mask that is rendered at a periphery of a display panel of a head-mounted display (HMD) in order to hide unwanted visual artifacts from view, as needed. A HMD may be worn by a user for purposes of immersing the user in a virtual reality (VR) environment or an augmented reality (AR) environment. One or more display panels of the HMD render images based on frames that are output by an application (e.g., a video game), and these images are viewed by a user through the optics that are included in the HMD, making the user perceive the images as if the user was immersed in a VR or AR environment.

A panel mask(s) may be rendered at a periphery of the display panel(s) of the HMD to provide a border around the images presented on the display panel(s). The panel mask frames the image much like a picture frame. In some embodiments, the inner edges of the panel mask(s) can be blurred (e.g., using a subtle vignette) to make the panel mask appear to the user as a near-field object that is close to (or disposed on) on the user's face, much like facial features (e.g., the nose bridge between the eyes) are seen when focusing on far-field objects.

As mentioned, the HMD may utilize a technique called "re-projection" to compensate for the application not hitting frame rate. During re-projection, a user wearing the HMD may rotate his/her head, which, as mentioned, may cause an unwanted strobing artifact to appear at the leading edge of the display panel(s) that is presently not covered by the panel mask. Accordingly, the HMD can detect when re-projection is, or is not, being used, and at least a portion of the panel mask can be dynamically adjusted in size based upon whether re-projection is, or is not, being used. For example, in cases where re-projection is ongoing, a portion of the panel mask may be adjusted (e.g., contracted away from a center of the display panel or expanded towards the center of the display panel) by an appropriate amount depending on an amount of rotation of the HMD during re-projection. This allows for covering up (or hiding) unwanted visual artifacts, such as a strobing flash, that may manifest during re-projection coupled with head movement. For instance, if the user rotates his/her head in a rightward direction while frames are being re-projected, the portion of the panel mask at the leading (e.g., right) edge of the display panel(s) may be increased in size to ensure that the unwanted strobing artifact is covered by the panel mask so that the user does not see the strobing flash in the image area of the display panel. When the user subsequently slows or ceases head rotation, or when the application hits frame rate again (i.e., the use of re-projection ceases), this expanded portion of the panel mask can be adjusted in size over time back to a fully contracted state so that more of the scene is rendered in the image area of the display panel. This technique of dynamically expanding and contracting at least a portion of the panel mask, based on head rotation coupled with re-projection, allows for a better viewing experience for a user of the HMD because the user does not notice the unwanted strobing artifact caused by re-projection during head rotation; the panel mask expands to occlude the strobing artifact when it is present, and the panel mask contracts after the strobing artifact has ceased to reveal more of the scene in the image area of the display panel.

An example process for dynamically adjusting a size of a portion of a panel mask, according to the embodiments described herein, includes determining, by one or more processors, whether a series of frames are being rendered on a display panel of a HMD using re-projection, determining, based at least in part on whether the series of frames are being rendered using re-projection, a target size value for at least a portion of a panel mask, determining that a size value associated with at least the portion of the panel mask is set to an existing size value that is not equal to the target size value, adjusting the size value from the existing size value to the target size value to increase or decrease a size of at least the portion of the panel mask from a current size to an adjusted size, and rendering a frame, of the series of frames, on the display panel along with the panel mask rendered at a periphery of the display panel, wherein at least the portion of the panel mask is rendered at the adjusted size in accordance with the target size value. If the size adjustment is to increase the size of the portion of the panel mask, the size of the portion of the panel mask can be subsequently decreased in size if the use of re-projection ceases and/or if head rotation slows or ceases altogether. For example, if the use of re-projection ceases, the portion of the panel mask can be decreased in size incrementally over a time period to a minimum size or some other target value. In this way, the contraction of the panel mask back to its fully contracted state is not visually distracting to the user.

Also disclosed herein are systems, including a HMD, configured to implement the techniques and processes disclosed herein, as well as non-transitory computer-readable media storing computer-executable instructions to implement the techniques and processes disclosed herein. Although the techniques and systems disclosed herein are discussed, by way of example, in the context of video game applications, and specifically VR gaming applications, it is to be appreciated that the techniques and systems described herein may provide benefits with other applications where HMDs are used, including, without limitation, non-VR applications (e.g., AR applications), and/or non-gaming applications, such as industrial machine applications, defense applications, robotics applications, and the like.

FIG. 1A is a diagram illustrating an example head-mounted display (HMD) 100 that includes a left display panel 102(L) and a right display panel 102(R), which make up a pair of display panels. Although the example HMD 100 includes two display panels, 102(L) and 102(R), it is to be appreciated that the HMD 100 may include a single display panel 102, or more than two display panels 102. Hence, "display panel 102," as used herein, may refer to either of the display panels 102(L) or 102(R) of a two-panel HMD 100, as shown in FIG. 1A, or it may refer to a single display panel 102 of a HMD 100 with any number of display panels (e.g., a single-panel HMD 100 or a multi-panel HMD 100).

The display panel(s) 102 may represent any suitable type of display, such as an emissive display that utilizes light emitting elements to emit light during presentation of image frames (herein referred to as "frames") on the display panel(s) 102. As an example, the left and right display panels 102(L) and 102(R) may comprise liquid crystal displays (LCDs), organic light emitting diode (OLED) displays, inorganic light emitting diode (ILED) displays, or any other suitable type of display that utilizes a suitable display technology for HMD applications.

The HMD 100 may represent a VR headset for use in VR systems, such as for use with a VR gaming system. However, the HMD 100 may additionally, or alternatively, be implemented as an AR headset for use in AR applications. In AR, a user sees virtual objects overlaid on a real-world environment, whereas, in VR, the user does not see a real-world environment, but is fully immersed in a virtual environment, as perceived via the display panels 102 and the optics (e.g., lenses) of the HMD 100. Examples described herein pertain primarily to a VR-based HMD 100, but it is to be appreciated that the HMD 100 is not limited to implementation in VR applications.

In general, an application executing on a computing device—such as the HMD 100 itself, or a computing device (e.g., a personal computer (PC), game console, etc.) associated with, and coupled to, the HMD 100—may be configured to output a series of frames 106 that are ultimately rendered on the display panel(s) 102 of the HMD 100. The image data of the frames 106 is presented within an image area 108 of the display panel(s) 102 that is not covered by a panel mask 110. FIG. 1A shows a left image area 108(L) at the center of the left display panel 102(L) and inside a left panel mask 110(L), and a right image area 108(R) at the center of the right display panel 102(R) and inside a right panel mask 110(R).

The series of frames 106 may be output from a video game application, or any other type of graphics-based application. The application may be executed in a graphics pipeline that outputs per-pixel values (e.g., color values) that are combined to create on image (within the image area 108) on the display panel(s) 102 with a desired visual effect. During runtime, a head tracking module of the HMD 100 may generate data about the position and pose of the HMD 100 that is provided to the application in order to inform the application regarding how to render a next frame 106 in the series of frames 106 in accordance with the user's 104 head position/pose. This allows for rendering imagery within the image area(s) 108 on the display panel(s) 102 in a way that makes the user 104 believe he/she is looking around a virtual environment that includes objects (both static and moving objects), and these objects move within the scene in an expected manner along with the user's 104 head movement.

As mentioned, a left panel mask 110(L) is rendered at a periphery of the left display panel 102(L) and a right panel mask 110(R) is rendered at a periphery of the right display panel 102(R). As used herein, "panel mask 110" may refer to either of the panel masks 110(L) or 110(R), as shown in FIG. 1A. However, a single-panel HMD 100 may include a single panel mask 110 that surrounds the image area 108 of a single display panel 102. At startup, the HMD 100 may compute a mesh for the panel mask(s) 110, which is used to render the panel mask(s) 110 in a fully contracted state at the periphery of the display panel(s) 102, meaning that the portions of the panel mask(s) 110 that are dynamically adjustable in size are initially rendered at a smallest size to reveal more of the scene within the image area(s) 108. In general, the panel mask(s) 110 may be persistently rendered along with each frame, although the size of individual portions of the panel mask(s) 110 may be adjusted in particular ones of the frames to hide unwanted visual artifacts, as needed. In some embodiments, the panel mask(s) 110 may be implemented as a plurality of black pixels at the periphery of the display panel(s) 102, which may be added to the frame buffer before rendering a frame. Although the panel mask(s) 110 is depicted in the figures as a generally annular-shaped panel mask that encloses a generally circular-shaped image area 108, it is to be appreciated that other geometries can be used to implement the panel mask(s) 110, such as by rendering the panel mask(s) 110 as a square, rectangular, or other geometrically-shaped frame surrounding the image area 108. In some embodiments, the panel mask(s) 110 may be implemented as three separate panel masks corresponding to red, green, and blue color channels, wherein each separate panel mask 110 of the three panel masks 110 is shaped based on a known chromatic distortion of the optics included in the HMD 100 to mitigate effects of color fringing, which may occur at or near the outer edge of the display panel 102. When the user 104 looks through the lenses in the HMD 100, for example, there may be some natural spatial (radial) distortion due to the lenses distorting the image to some degree (known as a "pincushion" effect in VR headsets). There may also be some chromatic distortion (e.g., red, green, blue (RGB) separation). If the user's 104 eyes happen to be close enough to the lens assembly to where the user 104 can actually see the edges of the display panels 102, the user 102 may see cyan fringing on the panel edges, which comes from the chromatic distortion that separates RGB, where the red pixels are chromatically distorted the most (toward the center of the display panel 102), followed by a lesser amount of distortion for the green pixels, and the least amount of distortion for the blue pixels (e.g., the blue is distorted the least, remaining closest to the edge of the panel, causing the cyan fringing effect). This color fringing can be quite distracting for the users who can see it (depending on the thickness of the foam used in the HMD 100, the spatial geometry of the user's face, and so on, the user 104 may or may not see the color fringing). Accordingly, the separate panel masks of a three-panel mask implementation on each display panel 102 may independently mask red, green, and blue to mitigate the color fringing effect.

FIG. 1A shows the left panel mask 110(L) as a relatively dark grey area, and the right panel mask 110(R) as a relatively light grey area. This is merely for purposes of distinguishing the two panel masks from each other in the relevant figures, and it is to be appreciated that the pair of panel masks 110(L) and 110(R) may be rendered in a uniform color (e.g., black pixels) on both display panels 102(L) and 102(R). In this manner, the user 104 perceives the two panel masks 110(L) and 110(R) as a single panel mask that surrounds the two image areas 108(L) and 108(R), much like a human perceives an environment with eye sockets and a nose bridge that surround each eye in a near field of view. As mentioned, the inner edge 112 of each panel mask 110(L) and 110(R) may be blurred slightly (e.g., using a subtle vignette) to mimic near-field facial features, which is more familiar to humans than a sharp inner edge 112 would be.

In addition, individual portions of each of the panel masks 110(L) and 110(R) are dynamically adjustable in size to expand and contract portions of the panel mask 110 to cover more or less of the image area 108, as needed, for each frame 106 of the series of frames 106. For example, a portion of the panel mask(s) 110 may increase in size by expanding inward toward a center of the display panel(s) 102, which allows for covering up (or hiding) unwanted visual artifacts that manifest at that portion of the display panel(s) 102 during re-projection coupled with head rotation.

As mentioned, displays used in VR systems typically operate at a minimum refresh rate that is suitable for VR applications. As such, the display panel(s) 102 of the HMD 100 may operate at a refresh rate of say, 90 Hz, which is a common refresh rate for VR displays. Although 90 Hz is used as an example refresh rate, it is to be appreciated that the display panel(s) 102 may operate at other, different refresh rates, without changing the basic characteristics of the techniques and systems disclosed herein. In a "live rendering" scenario, the application that outputs the series of frames 106 may output actual frames 106(A) at a frame rate that matches the refresh rate of the display panel(s) 102 (e.g., actual frames 106(A) are output at 90 frames per second). However, in instances where the application is not hitting frame rate (i.e., outputting actual frames 106(A) at something less than 90 frames per second), the HMD 100 may be configured to employ re-projection (e.g., rotation-only re-projection) to replace missing actual frames 106(A) with re-projected frames 106(R), and the HMD 100 may do so in a way that accounts for the user's 104 head rotation, making it appear to the user 104 as if the application is hitting frame rate and that the scene is moving about the display panels 102 in an expected manner given the user's 104 head rotation. FIG. 1A illustrates this re-projection scenario— where the series of frames 106 includes an actual frame 106(A)(1), followed by a re-projected frame 106(R)(2), followed by another actual frame 106(A)(3), and so on and so forth. For instance, in the example of FIG. 1A, the application may be outputting frames at half of the ideal frame rate (e.g., at a frame rate of 45 frames per second, where 90 frames per second is the ideal frame rate). In this case, every other frame between sequential actual frames 106(A) is a re-projected frame 106(R). A re-projected frame 106(R) is generated using pixel data from a recently-rendered actual frame 106(A) (e.g., the most recently-rendered actual frame 106(A)) to create a scene that is transformed (e.g., through rotation and re-projection calculations) in a way that accounts for the user's 104 head rotation. Assuming that the actual frame 106(A)(1) is rendered before the re-projected frame 106(R)(2) in FIG. 1A, the re-projected frame 106(R)(2) can be derived from the pixel data associated with the previously-rendered actual frame 106(A)(1). In this case, the scene of the previously-rendered actual frame 106(A)(1) is rotated and re-projected to create the re-projected frame 106(R)(2) in a manner that the user 104 would expect given his/her head movement.

When the series of frames 106 are being rendered on the display panel(s) 102 of the HMD 100 using re-projection, and when the user 104 is rotating his/her head, a strobing flash may appear at the leading edge of each display panel 102 in the direction of head rotation. For instance, in FIG. 1A, the user 104 is shown as rotating his/her head in a rightward (i.e., positive X) direction of rotation. In this scenario, the aforementioned strobing flash may occur during re-projection, and it may manifest at the right edge (i.e., the leading edge in the direction of rotation) of each display panel 102(L) and 102(R) because there is no pixel data available in the previously-rendered actual frame 106(A)(1) to render the pixels at the right edge of the each display panel 102(L) and 102(R) for the re-projected frame 106(R)(2) since the user 106 has rotated in the rightward direction. Accordingly, the HMD 100 may be configured to dynamically increase the size of a right portion of each panel mask 110 to cover up (or hide) this unwanted visual artifact. Without changing the size of the right portion of each panel mask 110, this strobing artifact may be visible within the image area(s) 108 of the display panel(s) 102.

In an illustrative example, the HMD 100 may include logic (e.g., software, hardware, and/or firmware, etc.) that is configured to determine whether a series of frames 106 are being rendered on a display panel(s) 102 of the HMD 100 using re-projection. That is, the logic may determine whether one or more of the frames 106 in the series of frames 106 are re-projected frames 106(R) generated from pixel data associated with actual frames 106(A) received from an application that have already been rendered on the display panel(s) 102. In some embodiments, the logic may make this determination upon rendering the re-projected frame 106(R)(2). In other embodiments, the logic may make this determination after rendering the actual frame 106(A)(1), but before rendering the re-projected frame 106(R)(2). In any case, if re-projection is being used, the logic may also be configured to determine, based at least in part on rotation data provided by a head tracking module of the HMD 100 indicating that the HMD 100 has rotated (e.g., between time, $t_1$, and time, $t_2$), a target size value for each adjustable portion of the panel mask(s) 110. If the target size value for a given portion of the panel mask(s) 110 is not equal to an existing size value for that portion, the logic may respond by adjusting a size value associated with at least a portion of the panel mask(s) 110 from the existing size value to the target size value to increase a size of at least the portion of the panel mask 110 from a current size to an adjusted size, and by rendering a frame (e.g., the actual frame 106(A)(3)), of the series of frames 106, on the display panel(s) 102 along with the panel mask(s) 110 rendered at a periphery of the display panel(s) 102, wherein at least the portion of the panel mask(s) 110 is rendered at the adjusted size. Consider an example where the left panel mask 110(L) and the right panel mask 110(R) are each partitioned into left, right, top, and bottom portions. FIG. 1A shows that a right portion of the left panel mask 110(L) and a right portion of the right panel mask 110(R)—each portion corresponding to the rightward direction of rotation—increase in size from a current size to an increased size. This is indicated in FIG. 1A by the inner edge 112(L) of the left panel mask 110(L) moving inward toward the center of the left display panel 102(L) (i.e., from the dashed line to the solid line), and by the inner edge 112(R) of the right panel mask 110(R) moving inward towards the center of the right display panel 102(R) (i.e., from the dashed line to the solid line). In other words, the right portion of each panel mask 110 is pulled inward to expand the size of the right portion of each panel mask 110 so that more of the image area 108 on the right edge/side of the display panel(s) 102 is covered by the panel mask(s) 110. These "inward" adjustments occur when the target size value is greater than the existing size value for the relevant portion of the panel mask(s) 110.

Figure 1B:
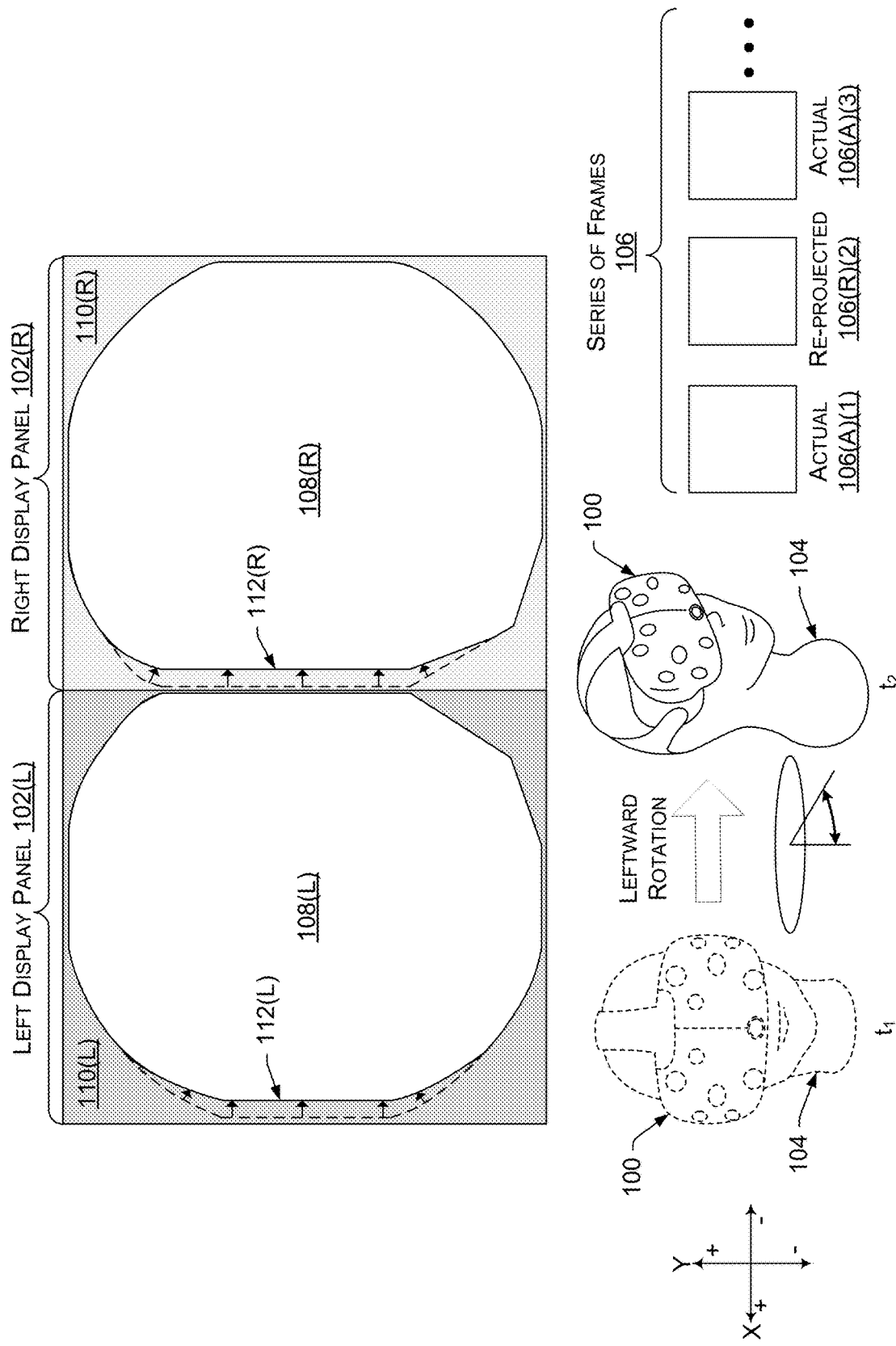
FIG. 1B is a diagram illustrating the example left and right display panels of the HMD of FIG. 1A where a frame is rendered with a dynamically expanded panel mask during head rotation while frames are being processed using re-projection, the direction of head rotation being in a leftward (or negative X) direction.

FIG. 1B is a diagram illustrating the example left and right display panels 102 of the HMD 100 of FIG. 1A, where a frame 106 (e.g., the actual frame 106(A)(3)) is rendered with a dynamically expanded panel mask(s) 110 during head rotation while frames 106 are being processed using re-projection, the direction of head rotation being in a leftward (or negative X) direction in FIG. 1B, which is opposite to the direction of rotation shown in FIG. 1A. In the scenario of FIG. 1B, the logic of the HMD 100 is configured to respond similarly to how it responds in the scenario of FIG. 1A, the difference being that a different portion (i.e., the left portion) of each panel mask 110 is resized in response to the different direction of rotation that is detected by the HMD 100. For example, when there is leftward (i.e., negative X) rotation during re-projection, the left portion of each panel mask 110 is pulled inward to expand the size of the left portion of the panel mask 110 so that more of the image area 108 on the left edge/side of the display panel(s) 102 is covered by the panel mask(s) 110.

Likewise, it can be appreciated that upward or downward directions of head rotation can cause the top portion and bottom portion, respectively, of each panel mask 110 to dynamically increase in size (e.g., by expanding inward toward the center of the display panel(s) 102) so that more of the image area 108 on the top/bottom edge/side of the display panel(s) 102 is covered by the panel mask(s) 110. It can be appreciated that, if a rotational directionality of the HMD's 100 is a vector having both X and Y components, this may cause adjacent portions of the panel mask 110 to simultaneously expand in size. For example, if the user 104 were to rotate his/her head diagonally into the positive X-Y quadrant of the reference coordinate system shown in FIGS. 1A and 1B, both the right portion and the top portion of the panel mask(s) 110 may be simultaneously expanded in size such that the two adjacent portions of the panel mask 110 expand inward toward the center of the display panel 102 at the same time. It can also be appreciated that, in some implementations, the entire panel mask(s) 110 (i.e., all portions) may be expanded in size, causing the image area(s) 108 to contract (or get smaller) as more of the image area(s) 108 is covered by an expanded panel mask(s) 110. Subsequently, when the entire panel mask(s) 110 contracts down to a smaller size, the image area(s) 108 may dilate back to a maximum size of the image area(s) 108 as less of the image area(s) 108 is covered by a contracted panel mask(s) 110.

Figure 2:
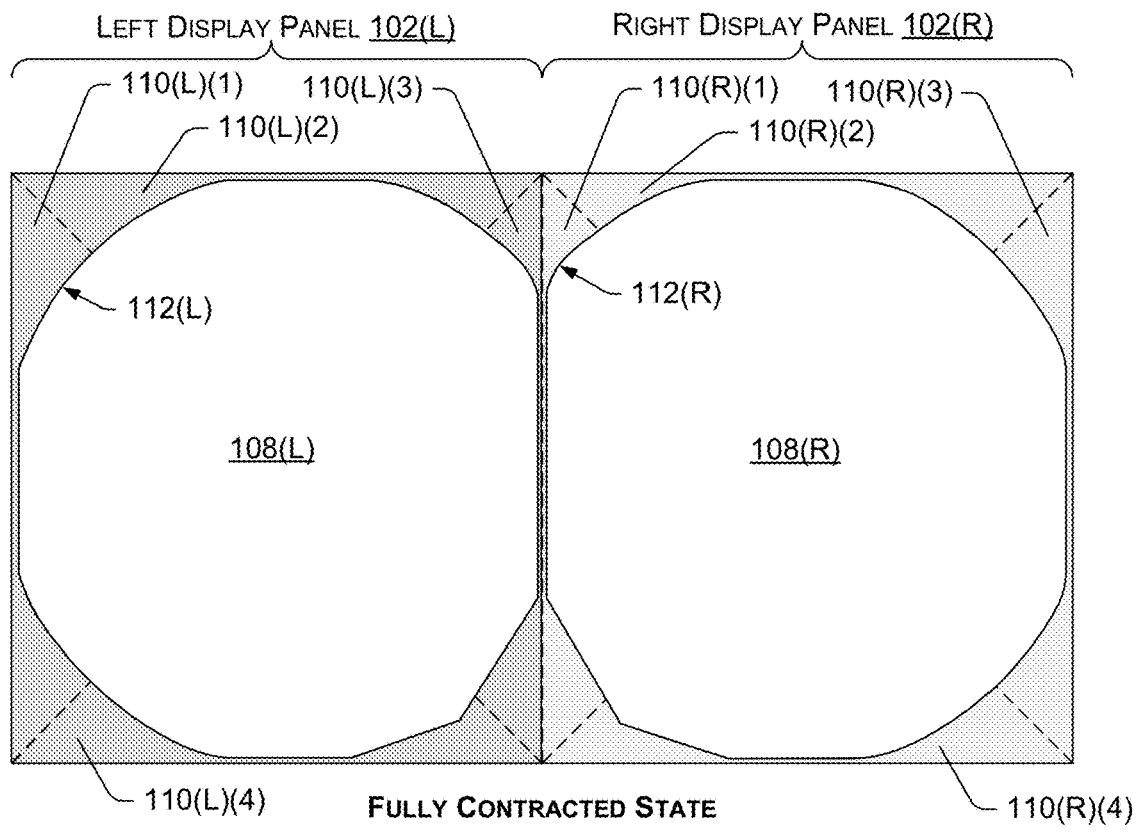
FIG. 2 is a diagram illustrating example left and right display panels of a HMD showing a difference between a fully contracted state of the panel masks and a fully expanded state of the panel masks.
Figure 2:
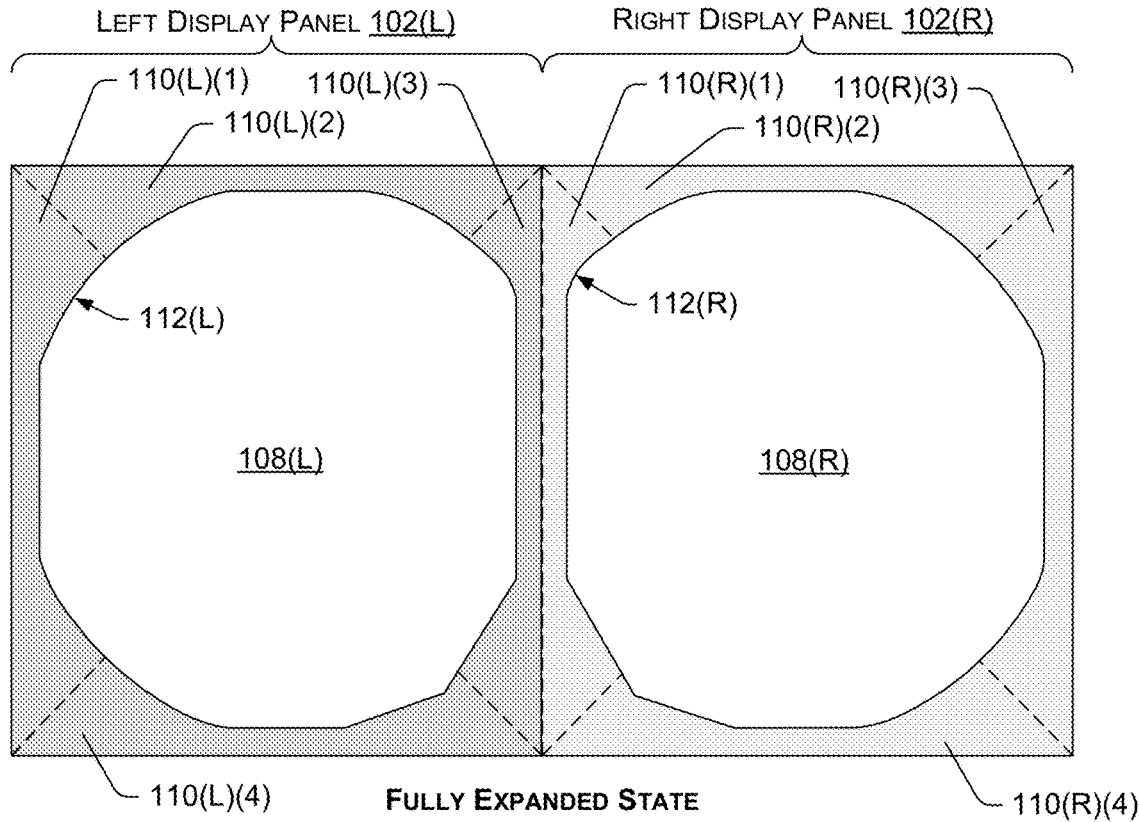

FIG. 2 is a diagram illustrating example left and right display panels 102 of a HMD 100 showing a difference between a fully contracted state of a panel mask(s) 110 at the top of FIG. 2 and a fully expanded state of the panel mask(s) 110 at the bottom of FIG. 2. As mentioned, individual portions of the panel mask 110 for each display panel 102 can be dynamically adjusted in size, as needed, to cover more or less of the image area 108 of each display panel 102. There may be limits or bounds for these size adjustments. For example, an individual portion of the panel mask 110 may be increased up to, but not beyond, a maximum size, and decreased down to, but not below, a minimum size. In this sense, the panel mask 110 can be persistently rendered with each frame, and its size is controllable based on values that range between the minimum size value (e.g., "0") and the maximum size value (e.g., "1"). In other words, the size value for an individual portion of the panel mask 110 is clamped between a minimum size value (e.g., "0") and a maximum size value (e.g., "1"), but is adjustable to any number between these two bounds, inclusive of these two bounds. One way of thinking about it is a percentage adjustment (e.g., 0 is 0%, 0.4 is 40%, 0.6 is 60%, 1 is 100%, etc.). As noted, this size adjustment can be controlled independently for individual portions of the panel mask 110.

For instance, consider partitioning the left panel mask 110(L) into four portions including a left portion 110(L)(1), a top portion 110(L)(2), a right portion 110(L)(3), and a bottom portion 110(L)(4). Likewise, the right panel mask 110(R) may be partitioned into four portions including a left portion 110(R)(1), a top portion 110(R)(2), a right portion 110(R)(3), and a bottom portion 110(R)(4). Each of these portions of the panel mask 110 can be adjusted in size between a minimum size value (e.g., a size value set to "0") corresponding to the fully contracted state at the top of FIG. 2, and a maximum size value (e.g., a size value set to "1") corresponding to the fully expanded state at the bottom of FIG. 2. Thus, there may be at least four dynamically adjustable size values for each panel mask 110 to control the size of the individual portions of the panel mask 110. The inner edge 112 of the panel mask 110 (at each portion of the panel mask 110) can be moved partway between the minimum extent (shown at the top of FIG. 2) and the maximum extent (shown at the bottom of FIG. 2) by setting the size value to a value between the minimum size value and the maximum size value (e.g., a size value between "0" and "1"). There may be reasons for persistently rendering the panel mask(s) 110 at a minimum size (i.e. in the fully contracted state) regardless of whether re-projection is being used and/or head rotation is present. For example, some HMDs 100 may exhibit color fringing at or near the outer edge of the display panel 102, and it may be desirable to cover up (or hide) such visual artifacts so that they are not a distraction to the user 104. Meanwhile, the panel mask(s) 110 need to expand in size beyond the maximum size value because there are practical limits to the rate of rotation of the HMD 100 when it is worn by a user 104, and there are practical limits to the perceivable visual elements when the user 104 is rotating his/her head at high speeds. For example, it is practically impossible for the average user 104 to rotate his/her head above a particular threshold angular velocity, and, therefore, the panel mask 110 does not need to be expanded to cover the entirety of the display panel 102 in this regard; the expansion of the panel mask can "bring in" the field of view just enough to cover unwanted visual artifacts. Moreover, even if the user 104 could rotate his/her head beyond this threshold angular velocity, the user 104 would not be able to discern the unwanted visual artifacts that manifest themselves at those high speeds of rotation because the eye simply can't track these visual elements when the field of view is changing at a rapid rate.

Figure 3:
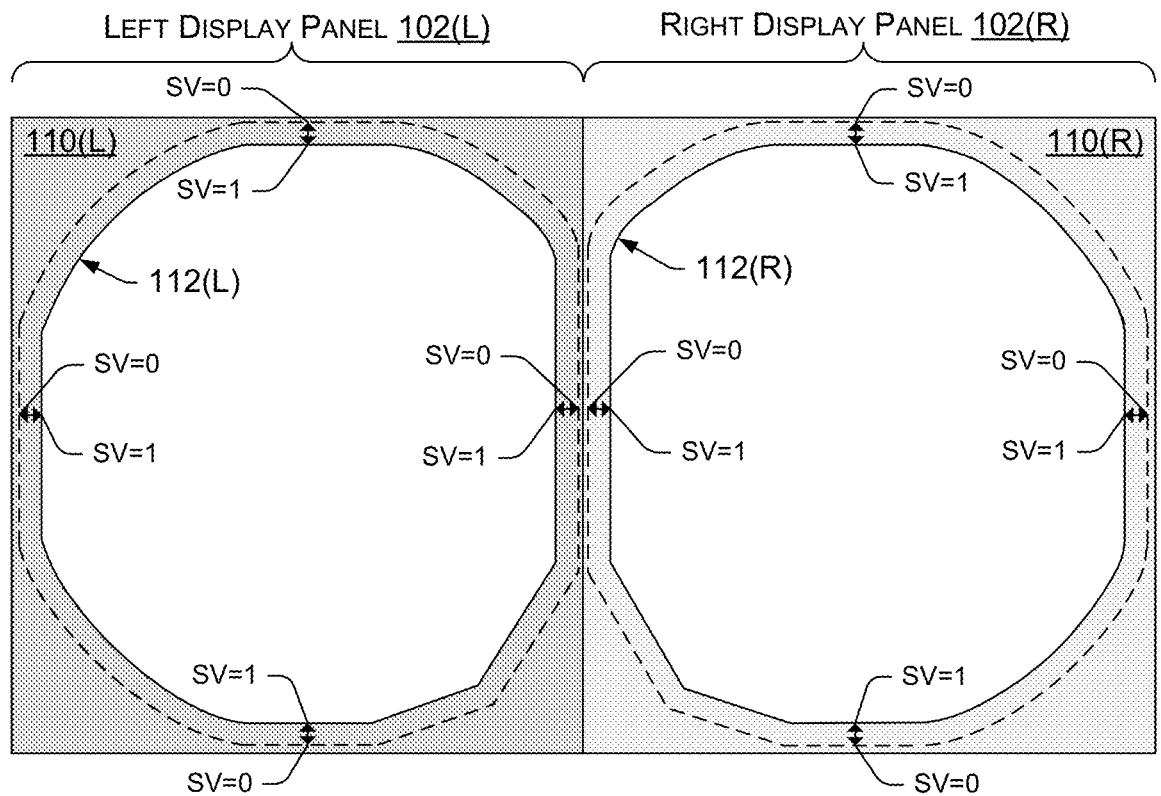
FIG. 3 is another diagram illustrating example left and right display panels of a HMD showing the difference between a fully contracted state of the panel masks and a fully expanded state of the panel masks.

FIG. 3 is another diagram illustrating example left and right display panels 102(L) and 102(R) of a HMD 100 showing the difference between a fully contracted state of the panel masks 110(L) and 110(R) and a fully expanded state of the panel masks 110(L) and 110(R). In FIG. 3, the fully contracted state is shown by the dashed lines that represent where the inner edges 112 of the panel masks 110 would be in the fully contracted state. Each portion (e.g., top, bottom, left, and right) of the panel mask 110 can have a size value (SV) set to zero (e.g., SV=0) to move the inner edge 112 of that portion of the panel mask 110 outward away from the center of the display panel 102 such that the portion of the panel mask 110 is decreased to its minimum size. The individual portions of the panel mask 110 may have their size values set to zero at startup of the HMD 100. In FIG. 3, the fully expanded state of the panel mask(s) 110 is shown by the solid lines that represent where the inner edges 112 of the panel masks 110 would be in the fully expanded state. Each portion of the panel mask 110 can have its size value set to one (e.g., SV=1) to move the inner edge 112 of that portion of the panel mask 110 inward toward the center of the display panel 102 such that the portion of the panel mask 110 is increased to its maximum size. As mentioned, the individual portions of the panel mask 110 can be adjusted to an intermediate size between the minimum size and the maximum size by setting the size value for each portion to an intermediate value between the minimum size value (e.g., "0") and the maximum size value (e.g., "1").

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
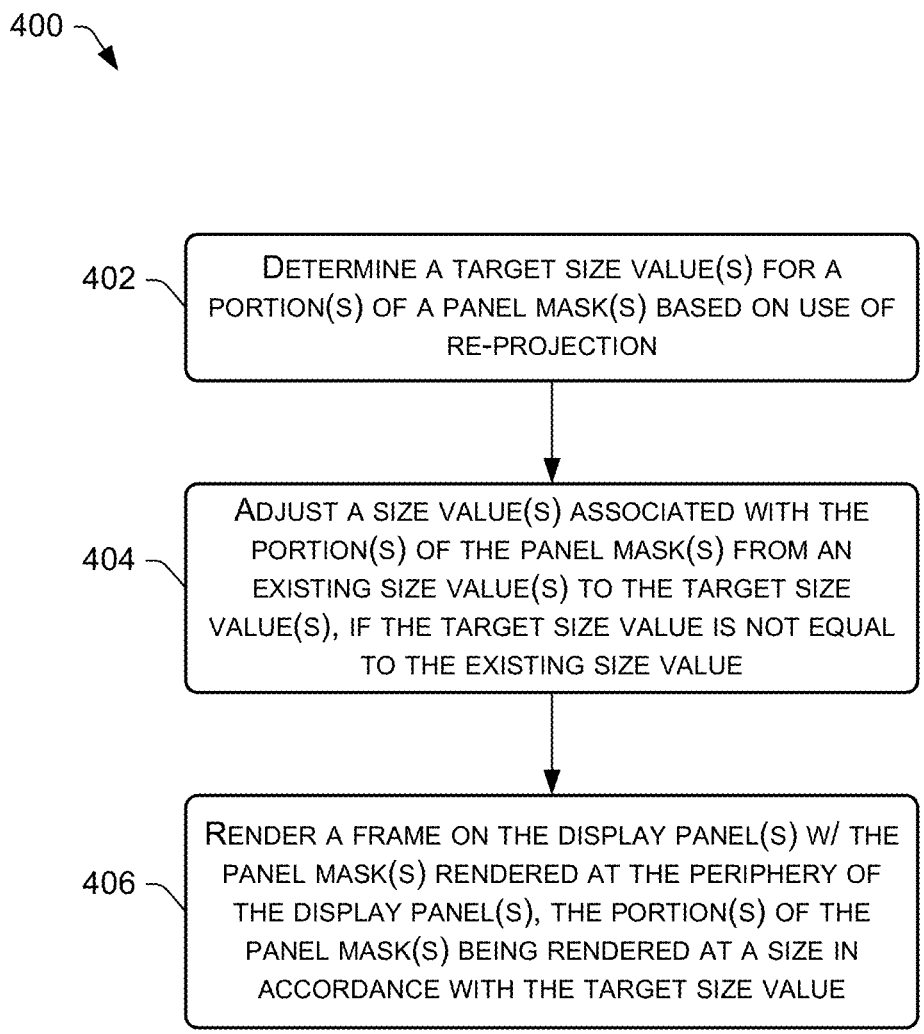
FIG. 4 is a flow diagram of an example process for dynamically re-sizing a portion of a panel mask on a display panel of a HMD, in accordance with embodiments disclosed herein.

FIG. 4 is a flow diagram of an example process 400 for dynamically re-sizing a portion of a panel mask 110 on a display panel 102 of a HMD 100, in accordance with embodiments disclosed herein. For discussion purposes, the process 400 is described with reference to the previous figures.

At 402, logic of a HMD 100 may determine a target size value(s) for at least a portion(s) of a panel mask(s) 110. For a given frame 106, the logic of the HMD 100 may, for example, determine four target size values corresponding to a left portion 110(L)(1), a top portion 110(L)(2), a right portion 110(L)(3), and a bottom portion 110(L)(4) of a left panel mask 110(L), as well as four target size values corresponding to a left portion 110(R)(1), a top portion 110(R)(2), a right portion 110(R)(3), and a bottom portion 110(R)(4) of a right panel mask 110(R). Thus, a total of eight target size values may be determined at block 402 for a two-panel HMD 100 that renders a left panel mask 110(L) and a right panel mask 110 for a given frame 106. The determination of the target size value(s) at block 402 may depend on whether re-projection is, or is not, currently being used to render the series of frames 106. If re-projection is ongoing (e.g., if the given frame 106 is part of a series of frames 106 that are being rendered using re-projection), then the target size value(s) may be determined based at least in part on rotation data provided by a head tracking module of the HMD 100. If re-projection is not ongoing, the target size value(s) may be set to a value(s) of zero at block 402. As mentioned, the target size value for an individual portion of the panel mask 110 may be clamped between a minimum size value (e.g., "0") and a maximum size value (e.g., "1") such that the target size value can be set to any value between these two bounds (e.g., between "0" and "1"), inclusive of these two bounds. In particular, while re-projection is ongoing, the target size value may be calculated as a value that corresponds to an amount that the HMD 100 has rotated. For instance, greater amounts of HMD 100 rotation correspond to target size values that are closer to the maximum size value (e.g., "1"), and lesser amounts of HMD 100 rotation correspond to target size values closer to the minimum size value (e.g., "0").

At 404, the logic of the HMD 100 may adjust a size value associated with at least the portion of the panel mask 110 from an existing size value to the target size value determined at block 402, assuming that the target size value is not equal to the existing size value. That is, if the target size value is equal to the existing size value, then the logic may refrain from making a size adjustment at block 404. Accordingly, if re-projection is ongoing, and if the logic determines that the size value associated with the portion of the panel mask is set to an existing size value that is less than the target size value, the adjustment at block 404 may result in a size of at least the portion of the panel mask 110 increasing from a current size to an increased size. If re-projection is not ongoing (resulting in a target size value of zero at block 402) and if the existing size value is currently non-zero, or if re-projection is ongoing and a non-zero target size value is otherwise less than the existing size value, the adjustment at block 404 may result in a size of at least the portion of the panel mask 110 decreasing from a current size to a decreased size. A downward size adjustment to a decreased size at block 404 may be a slow interpolation from a current size value to a lesser target value (e.g., the minimum value or some other target value) by a small amount (e.g., a per-frame lerp value of 0.005). In some embodiments, a downward size adjustment at block 404 is further conditioned on having not increased the size of the portion of the panel mask 110 over the course of a predetermined number of consecutive frames 106 preceding the current frame 106. For example, if the size of the portion of the panel mask 110 has not increased in the last ten consecutive frames, the size may be adjusted downward to a decreased size. Otherwise, if this consecutive frame criterion is not met, there may not be any adjustment to the size value at block 404.

At 406, the logic of the HMD 100 may render a frame 106, of the series of frames 106, on the display panel 102 along with the panel mask 110 rendered at a periphery of the display panel 102, wherein at least the portion of the panel mask 110 is rendered at a size (e.g., an adjusted size) in accordance with the target size value.

The process 400 allows for hiding unwanted visual artifacts that may occur during re-projection coupled with head rotation by virtue of the panel mask 110 expanding to cover the area of the display panel 102 where the unwanted visual artifacts would otherwise present themselves. This is shown, by way of example and not limitation, in FIGS. 1A and 1B, where a portion of the panel mask 110 on each display panel 102 is increased in size from a current size to an increased size and rendered with a frame 106 on the display panel(s) 102.

Figure 5:
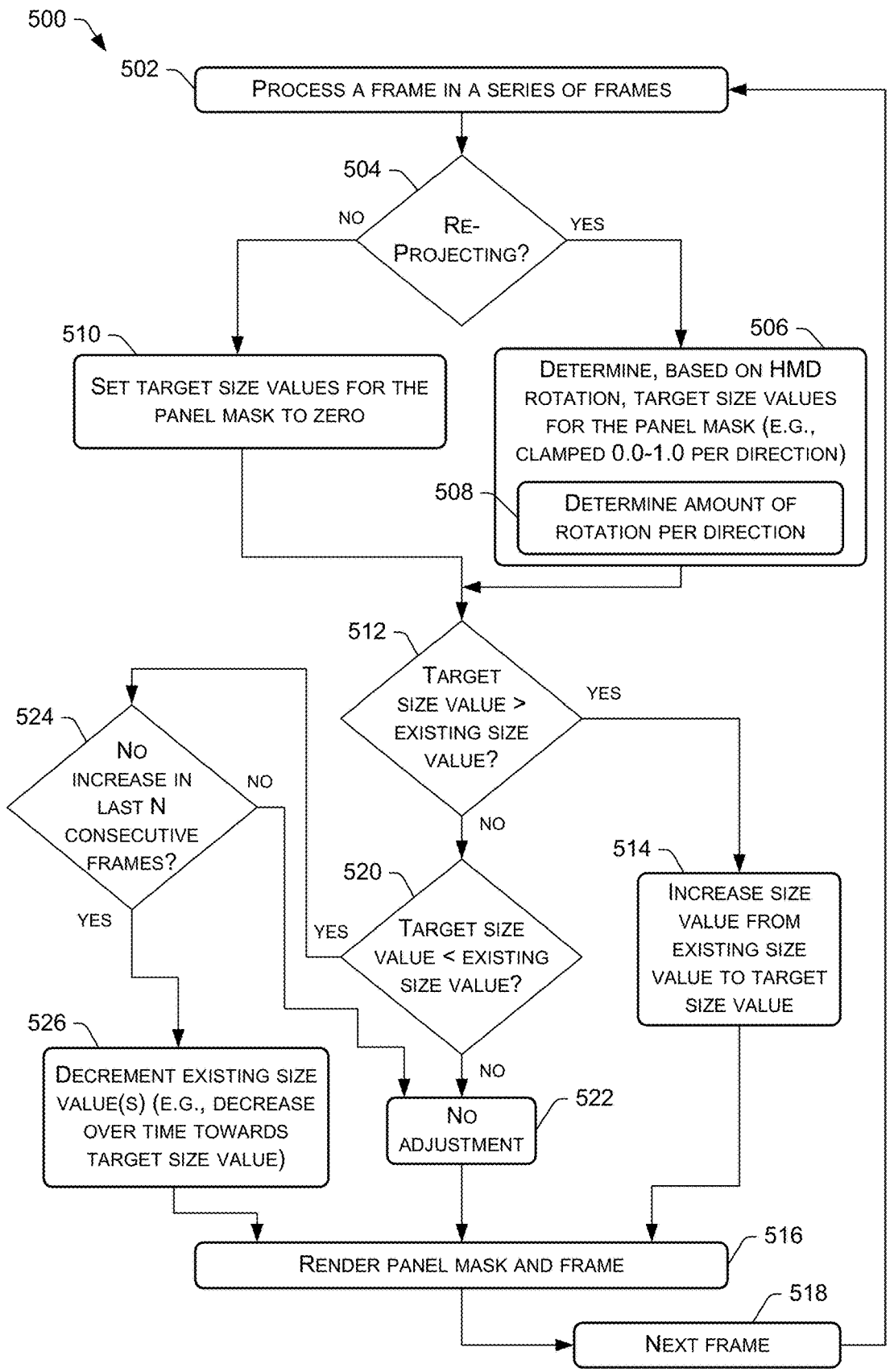
FIG. 5 is a flow diagram of a more detailed example process for dynamically re-sizing a portion of a panel mask on a display panel of a HMD, in accordance with embodiments disclosed herein.

FIG. 5 is a flow diagram of a more detailed example process 500 for dynamically re-sizing a portion of a panel mask 110 on a display panel 102 of a HMD 100, in accordance with embodiments disclosed herein. For discussion purposes, the process 500 is described with reference to the previous figures.

At 502, a frame 106, of a series of frames 106, is processed for rendering on a display panel(s) 102 of a HMD 100. At this point in time, the panel mask(s) 110 that is to be rendered on the display panel(s) 102 along with the frame 106 may have size values associated with individual portions of the panel mask(s) 110 set to existing size values that dictate whether those portions of the panel mask(s) 110 are in a fully contracted state, a fully expanded state, or somewhere in between. When the panel mask(s) 110 has not previously been expanded to an increased size, the existing size values for each portion may be set to a minimum size value (e.g., a size value of zero) corresponding to a fully contracted state.

At 504, logic of the HMD 100 may determine whether a most recently-rendered frame 106, of the series of frames 106, is a re-projected frame 106(R) that was derived from pixel data associated with a previously-rendered actual frame 106(A) that was received from an application. Said another way, the logic of the HMD 100 determines whether re-projection is occurring at present. If, at 504, it is determined that the series of frames 106 are being rendered on the display panel(s) 102 of the HMD 100 using re-projection, the process 500 may follow the "YES" route from block 504 to block 506.

At 506, logic of the HMD 100 may determine, based at least in part on rotation data provided by a head tracking module of the HMD 100, target size values for individual portions of the panel mask 110. For example, four target size values may be determined, based on HMD 100 rotation, clamped 0.0 to 1.0 per direction. That is, a first target size value between 0 and 1 (inclusive) may be determined for a left portion of the panel mask 110, a second target size value between 0 and 1 (inclusive) may be determined for a top portion of the panel mask 110, a third target size value between 0 and 1 (inclusive) may be determined for a right portion of the panel mask 110, and a fourth target size value between 0 and 1 (inclusive) may be determined for a bottom portion of the panel mask 110. This may be done for each panel mask 110, which means that a total of eight target size values may be determined at block 506 for left and right panel masks 110(L) and 110(R). In general, the direction and the amount of HMD 100 rotation dictates the portion of the panel mask 110 and the target size value, respectively, for that portion of the panel mask 110.

As shown by sub-block 508, the logic of the HMD 100 may determine, based on the rotation data provided by the head tracking module of the HMD 100, an amount of rotation of the HMD 100 per direction (e.g., amounts of rotation in left, right, up, and down directions) over a period of time since a rendered frame 106, of the series of frames 106, was last rendered. Any suitable manner of determining an amount of rotation in any unit of measurement may be utilized for the determination at block 508. For instance, a number of degrees of rotation between frames can be determined as the amount of rotation. In some embodiments, an amount of rotation determined at block 508 may be in the form of angular velocity. Directionality of the HMD's 100 rotation may be determined with reference to positive or negative horizontal and vertical directions, or any other suitable form of directional measurement, and the directionality of the HMD's 100 rotation may be broken down into component directions (e.g., left, right, up, and/or down directions in the X-Y plane). Accordingly, the logic at block 506 may include determining a portion(s), among multiple portions, of the panel mask(s) 110 that corresponds to the direction in which the HMD 100 has rotated. In general, the greater the amount of rotation of the HMD 100, the greater the target size value so that more of the image area 108 on the display panel 102 is covered by the panel mask 110 for a greater amount of rotation. In this sense, there may be a threshold amount of rotation that corresponds to a maximum size value for the portion of the panel mask 110, and if the amount of rotation of the HMD 100 meets or exceeds this threshold amount, the maximum size value may be selected as the target size value at block 506. If the amount of rotation of the HMD 100 is less than this threshold amount, the target size value is determined as something less than the maximum size value. In some embodiments, the target size value may be determined based on the relative differences of the re-projection transforms used for the previous frame 106 and the current frame 106. That is, instead of, or in addition to, determining the amount of rotation of the HMD 100, a relative difference between the re-projection transforms used during the previous frame 106 and the current frame 106 can be used to drive the calculation of the target size value based on the notion that the greater the difference between the re-projection transforms, the more of the display panel exhibits the unwanted visual artifacts (e.g., strobing flash between black pixels and illuminated/valid pixels).

If, at 504, it is determined that the series of frames 106 are not being rendered on the display panel(s) 102 of the HMD 100 using re-projection, the process 500 may follow the "NO" route from block 504 to block 510. After a previous iteration, this determination at block 504 may be a determination that re-projection has ceased. For instance, after rendering a frame 106 and proceeding to process a next frame at 502, the logic of the HMD 100 may determine that the series of frames 106 are being rendered without re-projection (e.g., without any re-projected frames 106(R)), indicating that the use of re-projection has ceased. Said another way, one or more future frames to be rendered on the display panel 102 may not include any re-projected frames 102(R), indicating that the use of re-projection has ceased, or is otherwise not occurring at present. This may occur when the application hits frame rate after previously failing to hit frame rate.

At 510, logic of the HMD 100 may set the target size values for individual portions of the panel mask 110 to zero (or a minimum size value). For instance, four target size values corresponding to left, top, right, and bottom portions of the panel mask 110 may be set to zero at block 510.

At 512, following either block 506/508 or block 510, logic of the HMD 100 may determine, for each individual portion of the panel mask 110, whether the target size value is greater than an existing size value for the portion of the panel mask 110. If it is determined, at block 512, that the target size value is greater than the existing size value, the process 500 may follow the "YES" route from block 512 to block 514.

At 514, logic of the HMD 100 may adjust (or change) a size value associated with the portion of the panel mask 110 from the existing size value to the target size value to increase a size of the portion of the panel mask 110 from a current size to an increased size. As indicated, this adjustment to increase the size may be based on the target size value being greater than the existing size value, indicating that the portion of the panel mask 110 is to be brought inward to cover more of the image area 108. In some embodiments, the size adjustment at block 514 is temporally smoothed to mitigate a sudden field of view change.

At 516, logic of the HMD 100 may render the frame 106 on the display panel(s) 102 along with the panel mask(s) 110 rendered at a periphery of the display panel(s) 102, wherein at least the portion of the panel mask is rendered at a size in accordance with the target size value, and at block 518, the next frame 106, in the series of frames 106, may be processed by iterating from block 502 for the next frame. Following block 514, the panel mask 110 may be rendered at block 516 at an increased size due to the increase from the existing size value to the target size value. It is also to be appreciated that, for a HMD 100 with a pair of display panels (e.g., the left display panel 102(L) and the right display panel 102(R)), the algorithm of FIG. 5 may be done independently for each panel mask 110(L) and 110(R). In practice, the same portions of each mask may be adjusted in the same, or a similar, manner in response to particular HMD 100 rotation during re-projection, such as when the leading edge portion of the panel mask 110 on each display panel 102 is expanded inward toward the center of each display panel 102, as depicted in the examples of FIGS. 1A and 1B. Furthermore, the frame 106 for which the panel mask 110 is rendered in accordance with newly determined target size values may be an actual frame 106(A) or a re-projected frame 106(R). In at least one example, the determination, at block 504, that re-projection is occurring is based on a previously-rendered re-projected frame 106(R). Accordingly, the subsequent frame may be an actual frame 106(A) received from the application, in which case, the panel mask 110 is rendered at block 516 in accordance with the calculated target size values along with the actual frame 106(A). Said another way, when re-projection is first detected, the first frame 106 that is rendered with a panel mask 110 that has been adjusted in size may be the next frame, which can be an actual frame 106(A) received from the application. In some embodiments, however, such as when multiple re-projected frames 106(R) are rendered between sequential actual frames 106(A) (e.g., when the application is outputting frames at, say, 30 frames per second, and two re-projected frames 106(R) are rendered between every actual frame 106(A)), the first frame 106 that is rendered with the increased size panel mask 110 may be the next re-projected frame 106(R).

Returning with reference to block 512, if it is determined, at block 512, that the target size value is not greater than the existing size value, the process 500 may follow the "NO" route from block 512 to block 520. At 520, logic of the HMD 100 may determine whether the target size value (for an individual portion of the panel mask 110) is less than the existing size value. If the answer at block 520 is "no", the process 500 may follow the "NO" route from block 520 to block 522, based on the determination that the target size value is equal to the existing size value. At 522, no adjustment is made to the size value for the given portion of the panel mask 110, and the frame is rendered at block 516 without any adjustment to the size of the portion of the panel mask 110. In other words, if it is determined that the panel mask 110 is already covering what it is supposed to be covering, then no adjustment is made. If, on the other hand, it is determined, at block 520, that the target size value for the portion of the panel mask 110 is less than the existing size value, the process 500 may follow the "YES" route from block 520 to block 524.

At 524, logic of the HMD 100 may determine whether a predetermined number of frames 106 (e.g., N frames, where N is equal to 5, 10, etc.) have been consecutively rendered without increasing a size of the relevant portion of the panel mask 110. If there has been an increase in the size of the relevant portion of the panel mask 110 over the course of the last N consecutive frames 106, the process 500 may follow the "NO" route from block 524 to block 522, where no adjustment is made to that portion of the panel mask 110, and to block 516 where the frame is rendered without any adjustment to the size of the relevant portion of the panel mask 110. This may be based on the notion that it may be beneficial to be somewhat confident that re-projection has ceased before contracting the panel mask 110 to uncover a previously covered portion of the image area 108. This confidence can be based on a particular number of consecutive frames 106(A) being rendered without increasing the size of the relevant portion of the panel mask 110. Accordingly, if there hasn't been any increase to the size of the relevant portion of the panel mask 110 over the course of the last N consecutive frames 106, the process 500 may follow the "YES" route from block 524 to block 526.

At 526, the size value may be decremented (e.g., incrementally adjusted downward) towards a lesser target value (e.g., the target size value, or otherwise to a minimum size value of "0", corresponding to a fully contracted state of the panel mask 110). This may allow for decrementing the size of the portion of the portion of the panel mask 110 over a time period (e.g., a period of roughly two seconds) from the existing size value to the target size value that is less than the existing size value, causing the portion of the panel mask 110 to decrease in size over the period of time from the current size to a lesser size. Thus, over the course of multiple frames, the decrementing at block 526 will eventually cause a previously expanded portion of the panel mask 110 to decrease in size. As head rotation slows and/or re-projection ceases, the previously expanded portion of the panel mask 110 may eventually decrease to a minimum size over multiple iterations of the process 500. This enables a controlled rate of contraction of the panel mask 110 at a rate that is unnoticeable to the human eye. In this manner, the contraction of the panel mask 110 may not be a distraction to the user 104. In some embodiments, the decrementing operation at block 526 is a slow interpolation step that decrements the existing size value to a lesser target value by a relatively small amount (e.g., a per-frame lerp value of 0.005). In other words, the logic may be configured to avoid contracting portions of the panel mask 110 faster than a maximum rate of contraction, meaning that if the user's 104 head rotation slows suddenly by a large amount, instead of decreasing the size of the portion of the panel mask 110 all the way down to the determined target size value, the existing size value can, instead, be decremented to an intermediate size value that is greater than the target size value and less than the existing size value. In some embodiments, if the target size value is between the lesser size value and the existing size value, the decrementing at block 526 decrements to the target size value. After decrementing the existing size value (e.g., making the existing size value a particular percentage (e.g., 5%) smaller), the process 500 may proceed from block 526 to block 516 where the frame 106 is rendered on the display panel 102 along with the panel mask, wherein the portion of the panel mask 110 that was decremented in size is rendered at a decreased size, relative to a previous size of the portion of the panel mask 110.

It can be appreciated that, upon subsequent iterations of the process 500, it may be determined, at block 504, that re-projection is still being used for rendering the series of frames 106, or that re-projection has ceased, which dictates whether the individual portions of the panel mask 110 are to be dynamically increased, decreased, or left unchanged relative to a previous size adjustment. In general, the appropriate portions of the panel mask 110 increase in size during re-projection coupled with more HMD 100 rotation, and when HMD 100 rotation slows and/or re-projection ceases, the panel mask 110 portions may decrease in size to reveal more image area 108 on the display panel 102.

Figure 6:
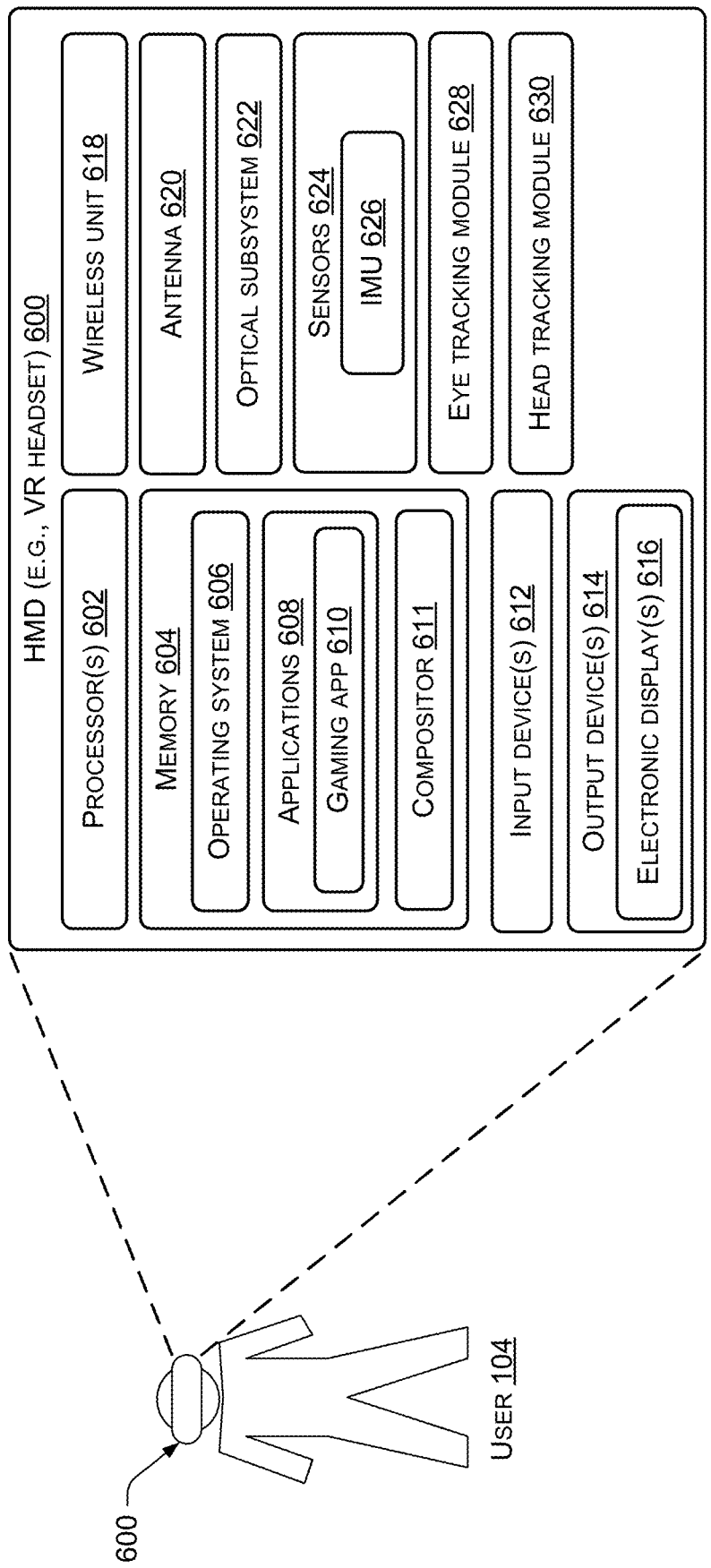
FIG. 6 illustrates example components of a wearable device, such as a VR headset, in which the techniques disclosed herein can be implemented.

FIG. 6 illustrates example components of a HMD 600, such as a VR headset, according to the embodiments disclosed herein may be embedded. The HMD 600 may be the same as, or similar to, the HMD 100 referenced in the previous figures, and, therefore, the components of the HMD 600 shown in FIG. 6 may be implemented in the HMD 100. The HMD 600 may be implemented as a standalone device that is to be worn by a user 104 (e.g., on a head of the user 104). In some embodiments, the HMD 600 may be head-mountable, such as by allowing a user 104 to secure the HMD 600 on his/her head using a securing mechanism (e.g., an adjustable band) that is sized to fit around a head of a user 104. In some embodiments, the HMD 600 comprises a virtual reality (VR) or augmented reality (AR) headset that includes a near-eye or near-to-eye display(s). As such, the terms "wearable device", "wearable electronic device", "VR headset", "AR headset", and "head-mounted display (HMD)" may be used interchangeably herein to refer to the device 600 of FIG. 6. However, it is to be appreciated that these types of devices are merely example of a HMD 600, and it is to be appreciated that the HMD 600 may be implemented in a variety of other form factors.

In the illustrated implementation, the HMD 600 includes one or more processors 602 and memory 604 (e.g., computer-readable media 604). In some implementations, the processors(s) 602 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 602 may possess its own local memory, which also may store program modules, program data, and/or one or more operating systems.

The memory 604 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 604 may be implemented as computer-readable storage media ("CRSM"), which may be any available physical media accessible by the processor(s) 602 to execute instructions stored on the memory 602. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 602.

In general, the HMD 600 may include logic (e.g., software, hardware, and/or firmware, etc.) that is configured to implement the techniques, functionality, and/or operations described herein. The computer-readable media 604 is shown as including various modules, such as instruction, datastores, and so forth, which may be configured to execute on the processor(s) 602 for carrying out the techniques, functionality, and/or operations described herein. A few example functional modules are shown as stored in the computer-readable media 604 and executable on the processor(s) 602, although the same functionality may alternatively be implemented in hardware, firmware, or as a system on a chip (SOC), and/or other logic.

An operating system module 606 may be configured to manage hardware within and coupled to the HMD 600 for the benefit of other modules. In addition, in some instances the HMD 600 may include one or more applications 608 stored in the memory 604 or otherwise accessible to the HMD 600. In this implementation, the application(s) 608 includes a gaming application 610. However, the HMD 600 may include any number or type of applications and is not limited to the specific example shown here. The gaming application 610 may be configured to initiate gameplay of a video-based, interactive game (e.g., a VR game) that is playable by the user 104, and to output frames (e.g., actual frames 106(A)) to be rendered on the display panels of the HMD 100. A compositor 611 may be configured to render, and to dynamically adjust, a panel mask 110 along with each frame as a late-stage rendering operation. Accordingly, the compositor 611, along with associated logic of the HMD 100, may perform the dynamic panel mask adjustment techniques disclosed herein.

Generally, the HMD 600 has input devices 612 and output devices 614. The input devices 612 may include control buttons. In some implementations, one or more microphones may function as input devices 612 to receive audio input, such as user voice input. In some implementations, one or more cameras or other types of sensors (e.g., inertial measurement unit (IMU)) may function as input devices 612 to receive gestural input, such as a hand and/or head motion of the user 104. In some embodiments, additional input devices 612 may be provided in the form of a keyboard, keypad, mouse, touch screen, joystick, and the like. In other embodiments, the HMD 600 may omit a keyboard, keypad, or other similar forms of mechanical input. Instead, the HMD 600 may be implemented relatively simplistic forms of input device 612, a network interface (wireless or wire-based), power, and processing/memory capabilities. For example, a limited set of one or more input components may be employed (e.g., a dedicated button to initiate a configuration, power on/off, etc.) so that the HMD 600 can thereafter be used. In one implementation, the input device(s) 612 may include control mechanisms, such as basic volume control button(s) for increasing/decreasing volume, as well as power and reset buttons.

The output devices 614 may include a display(s) 616, which may be the same as, or similar to, the display panel(s) 102 described with reference to the previous figures. The output devices 614 may further include, without limitation, a light element (e.g., LED), a vibrator to create haptic sensations, a speaker(s) (e.g., headphones), and/or the like. There may also be a simple light element (e.g., LED) to indicate a state such as, for example, when power is on.

The HMD 600 may further include a wireless unit 618 coupled to an antenna 620 to facilitate a wireless connection to a network. The wireless unit 618 may implement one or more of various wireless technologies, such as Wi-Fi, Bluetooth, radio frequency (RF), and so on. It is to be appreciated that the HMD 600 may further include physical ports to facilitate a wired connection to a network, a connected peripheral device (including a PC, game console, etc.), or a plug-in network device that communicates with other wireless networks.

The HMD 600 may further include optical subsystem 622 that directs light from the electronic display(s) 616 to a user's eye(s) using one or more optical elements. The optical subsystem 622 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 622 may have one or more coatings, such as anti-reflective coatings. Magnification of the image light by optical subsystem 622 allows electronic display(s) 616 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 622 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to electronic display(s) 616 for display is pre-distorted, and optical subsystem 622 corrects the distortion when it receives image light from electronic display(s) 616 generated based on the content.

The HMD 600 may further include one or more sensors 624, such as sensors used to generate motion, position, and orientation data. These sensors 624 may be or include gyroscopes, accelerometers, magnetometers, video cameras, color sensors, or other motion, position, and orientation sensors. The sensors 624 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 600 may include light sensors that are sensitive to light (e.g., infrared or visible light) that is projected or broadcast by base stations in the environment of the HMD 600.

In an example, the sensor(s) 624 may include an inertial measurement unit (IMU) 626. IMU 626 may be an electronic device that generates calibration data based on measurement signals received from accelerometers, gyroscopes, magnetometers, and/or other sensors suitable for detecting motion, correcting error associated with IMU 626, or some combination thereof. Based on the measurement signals such motion-based sensors, such as the IMU 626, may generate calibration data indicating an estimated position of HMD 600 relative to an initial position of HMD 600. For example, multiple accelerometers may measure translational motion (forward/back, up/down, left/right) and multiple gyroscopes may measure rotational motion (e.g., pitch, yaw, and roll). IMU 626 can, for example, rapidly sample the measurement signals and calculate the estimated position of HMD 600 from the sampled data. For example, IMU 626 may integrate measurement signals received from the accelerometers over time to estimate a velocity vector and integrates the velocity vector over time to determine an estimated position of a reference point on HMD 600. The reference point is a point that may be used to describe the position of wearable device 702. While the reference point may generally be defined as a point in space, in various embodiments, reference point is defined as a point within HMD 600 (e.g., a center of the IMU 626). Alternatively, IMU 626 provides the sampled measurement signals to an external console (or other computing device), which determines the calibration data.

The sensors 624 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

As mentioned, in some embodiments, the sensors 624 may include light sensors that are sensitive to light emitted by base stations in the environment of the HMD 600 for purposes of tracking position and/or orientation, pose, etc., of the HMD 600 in 3D space. The calculation of position and/or orientation may be based on timing characteristics of light pulses and the presence or absence of light detected by the sensors 624.

The HMD 600 may further include an eye tracking module 628. A camera or other optical sensor inside HMD 600 may capture image information of a user's eyes, and eye tracking module 628 may use the captured information to determine interpupillary distance, interocular distance, a three-dimensional (3D) position of each eye relative to HMD 600 (e.g., for distortion adjustment purposes), including a magnitude of torsion and rotation (i.e., roll, pitch, and yaw) and gaze directions for each eye. In one example, infrared light is emitted within HMD 600 and reflected from each eye. The reflected light is received or detected by a camera of the HMD 600 and analyzed to extract eye rotation from changes in the infrared light reflected by each eye. Many methods for tracking the eyes of a user 104 can be used by eye tracking module 628. Accordingly, eye tracking module 628 may track up to six degrees of freedom of each eye (i.e., 3D position, roll, pitch, and yaw) and at least a subset of the tracked quantities may be combined from two eyes of a user 104 to estimate a gaze point (i.e., a 31) location or position in the virtual scene where the user is looking). For example, eye tracking module 628 may integrate information from past measurements, measurements identifying a position of a user's 104 head, and 3D information describing a scene presented by electronic display(s) 616. Thus, information for the position and orientation of the user's 104 eyes is used to determine the gaze point in a virtual scene presented by MID 600 where the user 104 is looking.

The HMD 600 may further include a head tracking module 630. The head tracking module 630 may leverage one or more of the sensor 624 to track head motion, including head rotation, of the user 104, as described above. For example, the head tracking module 630 can track up to six degrees of freedom of the HMD 600 (i.e., 3D position, roll, pitch, and yaw). These calculations can be made at every frame 106 of a series of frames 106 so that the application 608 can determine how to render a scene in the next frame 106 (even for re-projected frames 106(R)) in accordance with the head position and orientation. In some embodiments, the head tracking module 630 is configured to predict a future position and/or orientation of the HMD 600 based on current and/or past data. This is because the application is asked to render a frame 106 before the user 104 actually sees the light (and, hence, the image) on the display(s) 616. Accordingly, a next frame 106 can be rendered based on this future prediction of head position and/or orientation that was made at an earlier point in time, such as roughly 25-30 milliseconds (ms) prior to rendering the frame 106. Rotation data provided by the head tracking module 630 can be used to determine both direction of HMD 600 rotation, and amount of HMD 600 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 600.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a head-mounted display (HMD) having a display panel;
one or more processors; and
logic configured to:
  determine that a series of frames are being rendered using re-projection;
  increase a size of at least a portion of a panel mask from a current size to an increased size based at least in part on determining that the series of frames are being rendered using the re-projection; and
  render a frame, of the series of frames, on the display panel along with the panel mask rendered at a periphery of the display panel, wherein at least the portion of the panel mask is rendered at the increased size.

2. The system of claim 1, wherein the logic is further configured to:
determine, after rendering the frame, that use of the re-projection has ceased;
decrease the size of at least the portion of the panel mask from the increased size to a decreased size; and
render a subsequent frame, of the series of frames, on the display panel along with the panel mask rendered at the periphery of the display panel, wherein at least the portion of the panel mask is rendered at the decreased size.

3. The system of claim 2, wherein the logic is further configured to:
  determine, after rendering the frame, that a predetermined number of frames have been consecutively rendered without increasing the size of at least the portion of the panel mask,
  wherein decreasing the size of at least the portion of the panel mask is based at least in part on determining that the predetermined number of frames have been consecutively rendered without increasing the size of at least the portion of the panel mask.

4. The system of claim 1, wherein the logic is further configured to:
  determine, based at least in part on rotation data provided by a head tracking module of the HMD, a first amount of rotation of the HMD since a rendered frame, of the series of frames, was rendered; and
  determine, based at least in part on the first amount of the rotation, a second amount by which the size of at least the portion of the panel mask is to be increased,
  wherein increasing the size of at least the portion of the panel mask comprises increasing the size of at least the portion of the panel mask by the second amount.

5. The system of claim 1, wherein the logic is further configured to:
  determine, based at least in part on rotation data provided by a head tracking module of the HMD, a direction in which the HMD has rotated since a rendered frame, of the series of frames, was rendered; and
  determine that at least the portion of the panel mask corresponds to the direction in which the HMD has rotated.

6. The system of claim 5, wherein at least the portion of the panel mask corresponds to a portion of the panel mask that is rendered at a leading edge of the display panel in the direction in which the HMD has rotated.

7. The system of claim 1, wherein the size of at least the portion of the panel mask is adjustable between a minimum and a maximum, the minimum corresponding to a fully contracted state of at least the portion of the panel mask, and the maximum corresponding to a fully expanded state of at least the portion of the panel mask.

8. The system of claim 1, wherein:
  the display panel is a first display panel of a pair of display panels, the pair of display panels including the first display panel and a second display panel; and
  the logic is further configured to:
    increase a size of at least a portion of a second panel mask from a second current size to a second increased size based at least in part on determining that the series of frames are being rendered using the re-projection; and
    render the frame, of the series of frames, on the pair of display panels along with the second panel mask rendered at a periphery of the second display panel, wherein at least the portion of the second panel mask is rendered at the second increased size.

9. A method comprising:
  determining, by one or more processors, that a series of frames are being rendered using re-projection;
  increasing a size of at least a portion of a panel mask from a current size to an increased size based at least in part on determining that the series of frames are being rendered using the re-projection; and
  rendering a frame, of the series of frames, on a display panel of a head-mounted display (HMD) along with the panel mask rendered at a periphery of the display panel, wherein at least the portion of the panel mask is rendered at the increased size.

10. The method of claim 9, further comprising:
  determining, after rendering the frame, that use of the re-projection has ceased;
  decreasing the size of at least the portion of the panel mask from the increased size to a decreased size; and
  rendering a subsequent frame, of the series of frames, on the display panel along with the panel mask rendered at the periphery of the display panel, wherein at least the portion of the panel mask is rendered at the decreased size.

11. The method of claim 9, further comprising:
  determining, based at least in part on rotation data provided by a head tracking module of the HMD, a first amount of rotation of the HMD since a rendered frame, of the series of frames, was rendered; and
  determining, based at least in part on the first amount of the rotation, a second amount by which the size of at least the portion of the panel mask is to be increased,
  wherein increasing the size of at least the portion of the panel mask comprises increasing the size of at least the portion of the panel mask by the second amount.

12. The method of claim 9, wherein:
  the display panel is a first display panel of a pair of display panels, the pair of display panels including the first display panel and a second display panel; and
  the method further comprises:
    increasing a size of at least a portion of a second panel mask from a second current size to a second increased size based at least in part on determining that the series of frames are being rendered using the re-projection; and
    rendering the frame, of the series of frames, on the pair of display panels along with the second panel mask rendered at a periphery of the second display panel, wherein at least the portion of the second panel mask is rendered at the second increased size.

13. The method of claim 12, further comprising:
  determining, based at least in part on rotation data provided by a head tracking module of the HMD, a direction in which the HMD has rotated since a rendered frame, of the series of frames, was rendered;
  determining that at least the portion of the first panel mask corresponds to a portion of the first panel mask that is rendered at a leading edge of the first display panel in the direction in which the HMD has rotated; and
  determining that at least the portion of the second panel mask corresponds to a portion of the second panel mask that is rendered at a leading edge of the second display panel in the direction in which the HMD has rotated.

14. A system comprising:
  a head-mounted display (HMD) having a display panel;
  one or more processors; and
  memory storing computer-executable instructions that, when executed by the one or more processors, cause the system to:
    determine whether a series of frames are being rendered using re-projection;
    adjust a size of at least a portion of a panel mask from a current size to an adjusted size based at least in part on whether the series of frames are being rendered using the re-projection; and
    render a frame, of the series of frames, on the display panel along with the panel mask rendered at a periphery of the display panel, wherein at least the portion of the panel mask is rendered at the adjusted size.

15. The system of claim 14, wherein:
determining whether the series of frames are being rendered using the re-projection comprises determining that the series of frames are being rendered using the re-projection;
adjusting the size comprises increasing the size; and
the adjusted size is an increased size greater than the current size.

16. The system of claim 15, further comprising a head tracking module to provide, to the one more processors, rotation data indicative of rotational movement of the HMD, wherein the computer-executable instructions, when executed by the one or more processors, further cause the system to:
determine, prior to rendering the frame, and based at least in part on the rotation data, a first amount of rotation of the HMD since a rendered frame, of the series of frames, was rendered, wherein a second amount by which the size of at least the portion of the panel mask is increased is based at least in part on the first amount of rotation; and
after rendering the frame:
determine that the series of frames are still being rendered using the re-projection;
determine, based at least in part on the rotation data, a third amount of rotation of the HMD since the frame was rendered, wherein the third amount of rotation is greater than the first amount of rotation;
increase the size of at least the portion of the panel mask from the increased size to a second increased size greater than the increased size based at least in part on determining that the series of frames are still being rendered using the re-projection; and
render a second frame, of the series of frames, on the display panel along with the panel mask rendered at the periphery of the display panel, wherein at least the portion of the panel mask is rendered at the second increased size.

17. The system of claim 15, further comprising a head tracking module to provide, to the one more processors, rotation data indicative of rotational movement of the HMD, wherein the computer-executable instructions, when executed by the one or more processors, further cause the system to:
determine, prior to rendering the frame, and based at least in part on the rotation data, a direction in which the HMD has rotated since a rendered frame, of the series of frames, was rendered; and
determine that at least the portion of the panel mask corresponds to the direction in which the HMD has rotated.

18. The system of claim 14, wherein:
determining whether the series of frames are being rendered using the re-projection comprises determining that the series of frames are being rendered without using the re-projection;
adjusting the size comprises decreasing the size; and
the adjusted size is a decreased size less than the current size.

19. The system of claim 18, wherein decreasing the size comprises decrementing the size of at least the portion of the panel mask over a time period from the current size to the decreased size.

20. The system of claim 14, wherein the size of at least the portion of the panel mask is adjustable between a minimum and a maximum, the minimum corresponding to a fully contracted state of at least the portion of the panel mask, and the maximum corresponding to a fully expanded state of at least the portion of the panel mask.

* * * * *